(12) United States Patent
Chun (10) Patent No.: US 12,435,837 B2
(45) Date of Patent: Oct. 7, 2025

(54) COMPRESSION-TYPE FUEL TANK

(71) Applicant: T.M.C CO., LTD., Gimhae-si (KR)

(72) Inventor: Sang Eon Chun, Geoje-si (KR)

(73) Assignee: T.M.C CO., LTD., Gimhae-si (KR)

( * ) Notice: Subject to any disclaimer, the term of this patent is extended or adjusted under 35 U.S.C. 154(b) by 0 days.

(21) Appl. No.: 18/560,683

(22) PCT Filed: Sep. 20, 2022

(86) PCT No.: PCT/KR2022/014009
§ 371 (c)(1),
(2) Date: Nov. 14, 2023

(87) PCT Pub. No.: WO2023/048447
PCT Pub. Date: Mar. 30, 2023

(65) Prior Publication Data
US 2024/0255107 A1    Aug. 1, 2024

(30) Foreign Application Priority Data

Sep. 23, 2021 (KR) .................. 10-2021-0125555

(51) Int. Cl.
*F17C 13/00* (2006.01)

(52) U.S. Cl.
CPC .... *F17C 13/001* (2013.01); *F17C 2201/0109* (2013.01); *F17C 2201/0176* (2013.01); *F17C 2203/015* (2013.01); *F17C 2203/0333* (2013.01); *F17C 2203/0639* (2013.01);
(Continued)

(58) Field of Classification Search
CPC ...... F17C 2205/0192; F17C 2201/0152; F17C 2205/0153; F17C 2205/01; F17C 2203/0329; F17C 2203/0333; F17C 3/04; F17C 13/001; F17C 2201/0171; F17C 2201/035
See application file for complete search history.

(56) References Cited

U.S. PATENT DOCUMENTS

| | | | | |
|---|---|---|---|---|
| 3,092,063 | A * | 6/1963 | Leroux | ............... B63B 25/16 220/560.12 |
| 3,655,086 | A * | 4/1972 | Trenner | ............. B32B 27/065 220/901 |
| 4,374,478 | A | 2/1983 | Secord | |
| 5,577,630 | A | 11/1996 | Blair et al. | |
| 6,991,770 | B2 | 1/2006 | Suzuki et al. | |
| 7,159,738 | B2 | 1/2007 | Luongo | |
| 10,065,751 | B2 | 9/2018 | Kawahara et al. | |

(Continued)

FOREIGN PATENT DOCUMENTS

| | | |
|---|---|---|
| CN | 1543548 A | 11/2004 |
| CN | 112682686 A | 4/2021 |

(Continued)

*Primary Examiner* — Stephen J Castellano
(74) *Attorney, Agent, or Firm* — NKL LAW; Jae Youn Kim (57) ABSTRACT

The present invention provides a compressed fuel tank, comprising: an inner tank in which liquefied gas is stored; a support rod penetrating a central axis of the inner tank and having both sides of the inner tank fixed at both ends thereof; an insulating member provided to surround the inner tank so as to block heat transfer to the outside; an outer tank accommodating the inner tank, the support rod and the insulating member therein; and a rod support part fixed to both sides of the inside of the outer tank to support both ends of the support rod so as to transfer the load of the inner tank to both sides of the outer tank.

11 Claims, 4 Drawing Sheets

(52) U.S. Cl.
CPC ... *F17C 2203/0646* (2013.01); *F17C 2221/012* (2013.01); *F17C 2223/0161* (2013.01)

(56) References Cited

U.S. PATENT DOCUMENTS

| | | | | |
|---|---|---|---|---|
| 2009/0050635 | A1* | 2/2009 | Richards | F17C 1/14 |
| | | | | 220/584 |
| 2011/0226781 | A1 | 9/2011 | Walser et al. | |
| 2021/0268897 | A1* | 9/2021 | Mair | G01G 19/08 |

FOREIGN PATENT DOCUMENTS

| | | |
|---|---|---|
| EP | 3421864 B1 | 1/2019 |
| GB | 2089014 A | 6/1982 |
| JP | S626157 B2 | 2/1987 |
| JP | H05240400 A | 9/1993 |
| JP | 2001-295995 A | 10/2001 |
| JP | 2004-324857 A | 11/2004 |
| JP | 2005-155776 A | 6/2005 |
| JP | 2006-349134 A | 12/2006 |
| JP | 2008-537990 A | 10/2008 |
| JP | 2011-501072 A | 1/2011 |
| JP | 2011-523693 A | 8/2011 |
| JP | 2013-184725 A | 9/2013 |
| JP | 2019-513608 A | 5/2019 |
| JP | 2021-076130 A | 5/2021 |
| KR | 10-2009-0125265 A | 12/2009 |
| KR | 10-2090266 B1 | 3/2020 |
| WO | 2009/140692 A | 11/2009 |

* cited by examiner

COMPRESSION-TYPE FUEL TANK

TECHNICAL FIELD

The present invention relates to a compressed fuel tank. More specifically, the present invention relates to a compressed fuel tank capable of efficiently storing cryogenic liquefied gas such as liquefied hydrogen or liquefied natural gas.

BACKGROUND ART

Recently, the severity of environmental pollution caused by the use of fossil fuel is increasing, and in particular, air pollution caused by exhaust gas from automobiles is becoming a serious problem.

In light of the above, the development and distribution of cars using natural gas, electric cars, and cars using hydrogen fuel are gradually increasing.

Among the above, hydrogen fuel is not only the most abundant element on earth following carbon and nitrogen, but is also a clean energy source which produces only a very small amount of nitrogen oxides during combustion and does not emit any other pollutants. In addition, hydrogen fuel may be produced using water which exists in an almost infinite amount on earth, and may be recycled back to water after use, and thus is an optimal energy source with little risk of depletion.

In general, hydrogen cars are driven using electrical energy generated by an electrochemical reaction between hydrogen supplied from a high-pressure hydrogen tank and oxygen in the air within a fuel cell stack.

Here, a typical hydrogen fuel tank applied to a hydrogen car stores hydrogen compressed at a high pressure of 350 bar to 900 bar so that it can store a large amount of hydrogen, and to this end, is manufactured using expensive composite materials.

It is very important for hydrogen fuel tanks applied to vehicles to safely store high-capacity hydrogen in a small size to secure riding space and sufficient travel distance.

However, since conventional hydrogen fuel tanks store high-pressure compressed hydrogen, cracks may occur due to increase in internal pressure or impact applied from the outside, which may lead to an explosion when hydrogen leaks, thereby threatening the stability of the vehicle.

SUMMARY OF INVENTION

Technical Task

The present invention aims to provide a compressed fuel tank, specifically a compressed fuel tank capable of safely and easily storing cryogenic liquefied hydrogen so as to increase hydrogen storage capacity and reduce the size of the fuel tank.

The technical tasks to be achieved in the present invention are not limited to the technical tasks mentioned above, and other technical tasks not mentioned will be clearly understood by those skilled in the art from the following description.

Means for Solving Technical Task

In order to solve the tasks described above, the present invention provides a compressed fuel tank, comprising: an inner tank in which liquefied gas is stored; a support rod penetrating a central axis of the inner tank and having both sides of the inner tank fixed at both ends thereof; an insulating member provided to surround the inner tank so as to block heat transfer to the outside; an outer tank accommodating the inner tank, the support rod and the insulating member therein; and a rod support part fixed to both sides of the inside of the outer tank to support both ends of the support rod so as to transfer the load of the inner tank to both sides of the outer tank.

In addition, the rod support part is in the form of a plate integrally fixed to both sides of the inside of the outer tank to have the inner tank disposed therebetween and a coupling hole to which both ends of the support rod are coupled formed on the plate surface.

In addition, the inner tank is formed to have a plurality of modular tanks storing liquefied gas communicate with each other.

In addition, the modular tank is formed in a spherical or donut shape so as to uniformly distribute internal stress.

In addition, the plurality of modular tanks are connected by only partially joining each other so as to expand or contract according to temperature change, and the modular tanks disposed on both edges of the plurality of modular tanks are fixed to the support rod so as to suppress the plurality of modular tanks from expanding or contracting beyond a predetermined range.

In addition, the plurality of modular tanks have a communication hole formed in an interconnected area and a ring-shaped reinforcing material provided along the communication hole.

In addition, the support rod is provided to penetrate the communication hole formed in the plurality of modular tanks, and the outer peripheral surface of the support rod is disposed at a predetermined distance from the reinforcing material along the communication hole so that a space in which liquefied gas flows is formed between the outer peripheral surface of the support rod and the communication hole.

In addition, a support part supporting the outer peripheral surface of the support rod is provided in the communication hole to prevent the support rod from sagging.

In addition, the inner tank is made of one of stainless steel, invar steel, nickel steel, high manganese steel and aluminum.

In addition, the insulating member comprises: a first insulating material, which is a spray-type polymer foam, sprayed on the curved outer surface of the inner tank to be formed into a cylindrical shape; a second insulating material surrounding the first insulating material; and a third insulating material formed in a pipe shape to be coupled to the outer surface of the second insulating material.

In addition, the first insulating material is formed of a spray-type polyurethane foam, the second insulating material is formed of at least one of a composite insulating material in which a plurality of aluminum thin films and spacers are layered, aerogel or glass wool, and the third insulating material is formed of polyurethane foam processed into a pipe shape.

In addition, the insulating member is made of a composite insulating material in which a plurality of aluminum thin films and spacers are layered to surround the inner tank.

Effect of Invention

The compressed fuel tank according to an embodiment of the present invention is provided with multiple insulating members to surround an inner tank which stores liquefied hydrogen, to be accommodated in an outer tank functioning as a vacuum jacket. Accordingly, the compressed fuel tank may provide improved insulation performance, as well as safe and easy storage of cryogenic liquid hydrogen, and may also store hydrogen at a high density, thereby increasing hydrogen storage capacity.

In addition, a support rod is provided to protrude on both sides of the inner tank which stores liquefied hydrogen, and a rod support part supporting the support rod is integrally provided on both sides of the inside of the outer tank accommodating the inner tank, to transfer the load of the inner tank to both sides of the outer tank through the support rod and the rod support part. Accordingly, it is possible to prevent the load of the inner tank from being applied to the insulating member and causing deformation, thereby securing insulation performance and increasing structural stability.

In addition, the inner tank is formed to have a plurality of modular tanks communicate with each other. Accordingly, it is possible to manufacture the inner tank by increasing or reducing the number of modular tanks to match the storage capacity of liquefied hydrogen.

In addition, the modular tank is formed in a spherical or donut shape so that the internal expansion pressure is uniformly applied to the inner surface of the rounded tank. Accordingly, it is possible to suppress stress from being concentrated in any one part of the tank and uniformly distribute the stress, thereby improving structural safety of the tank.

In addition, the compressed fuel tank is configured to store cryogenic liquefied hydrogen so that hydrogen is stored at a high density. Accordingly, it is possible to greatly reduce the volume and weight compared to existing hydrogen fuel tanks with the same capacity, thereby being easily installed in vehicles.

The effects obtainable in the present invention are not limited to the above-mentioned effects, and other effects not mentioned may be clearly understood by those of ordinary skill in the art to which the present invention pertains from the following description.

BEST MODE FOR CARRYING OUT THE INVENTION

Hereinafter, preferred embodiments according to the present invention will be described in detail with reference to the accompanying drawings.

The detailed description set forth below in conjunction with the accompanying drawings is intended to describe exemplary embodiments of the present invention and is not intended to represent the only embodiments in which the present invention may be carried out.

In order to clearly explain the present invention in the drawings, portions that are not related to the present invention are omitted, and like reference numerals are used to refer to like elements throughout the specification.

In an embodiment of the present invention, expressions such as "or" and "at least one" may indicate one of the words listed together, or a combination of two or more.

Figure 1:
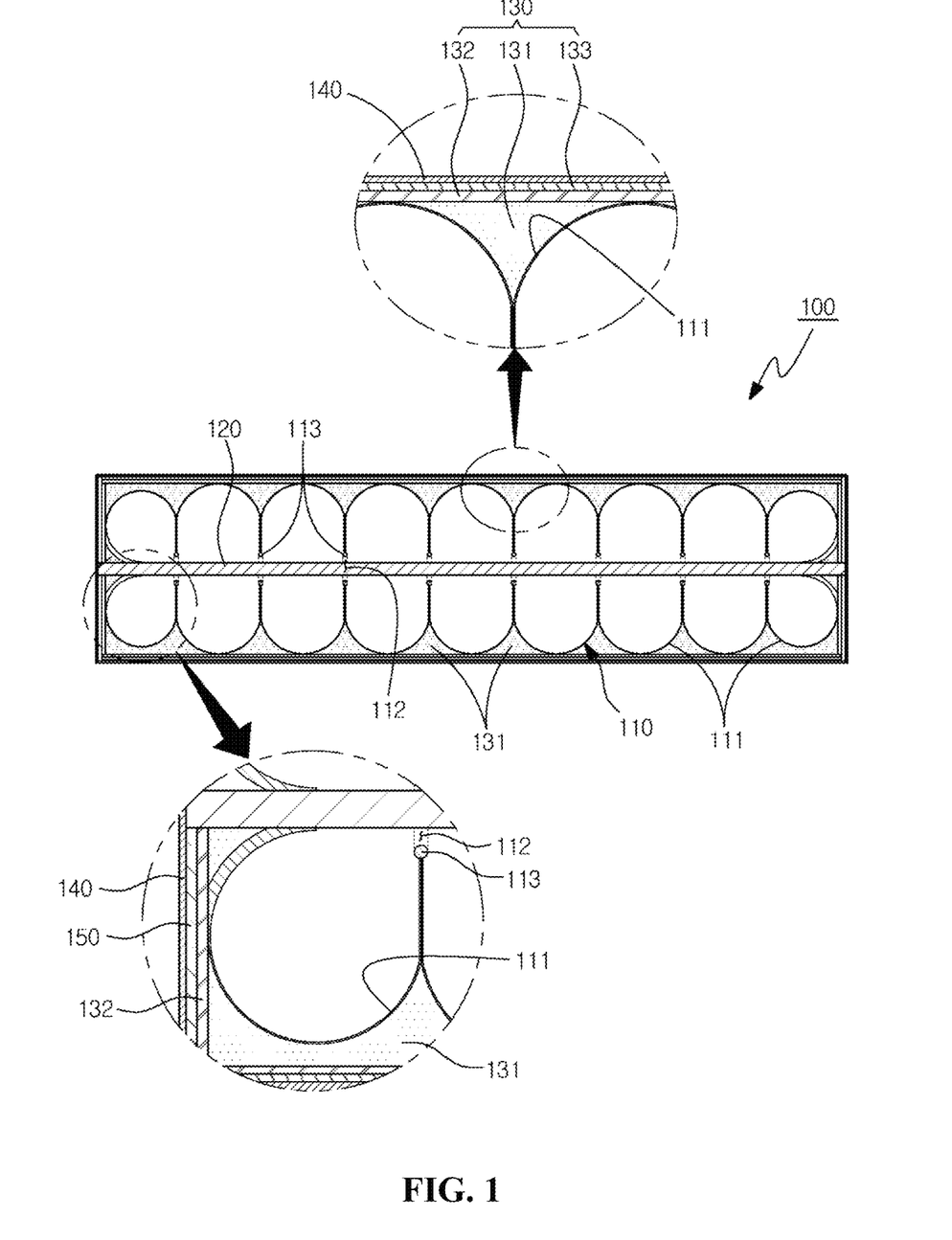
FIG. 1 is a cross-sectional view illustrating the structure of a compressed fuel tank according to an embodiment of the present invention.
Figure 2:
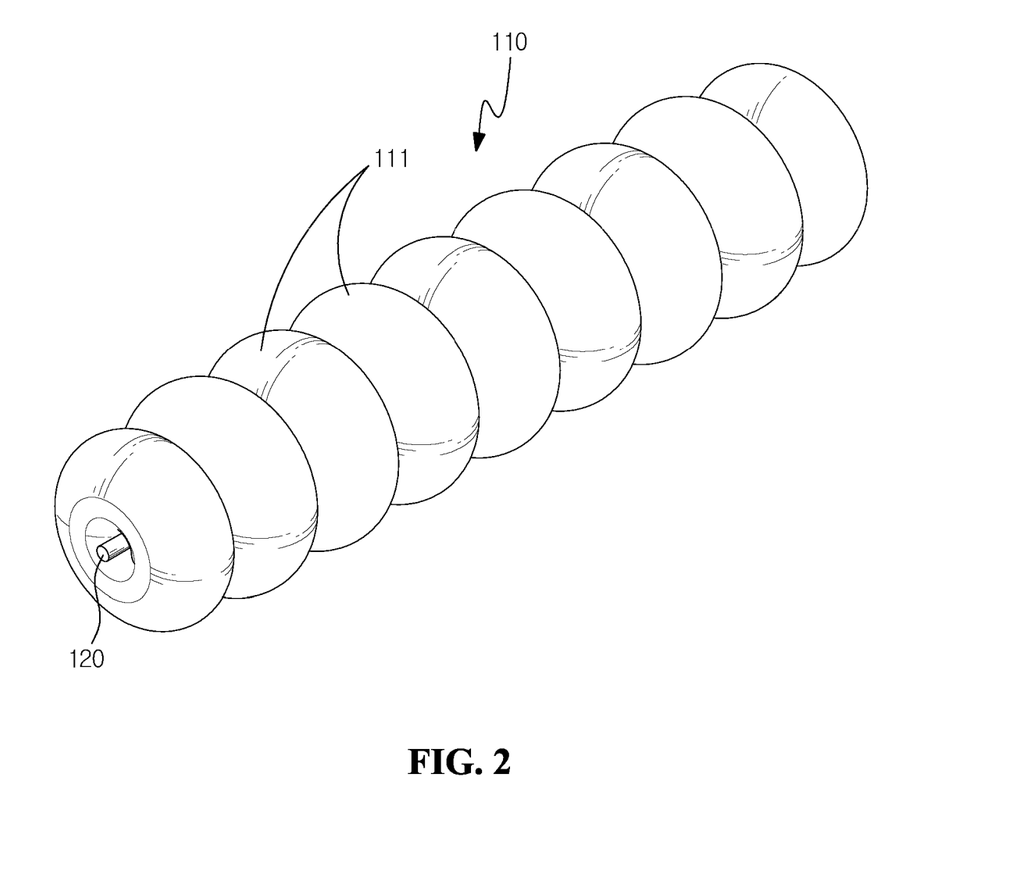
FIG. 2 illustrates an inner tank according to an embodiment of the present invention.
Figure 3:
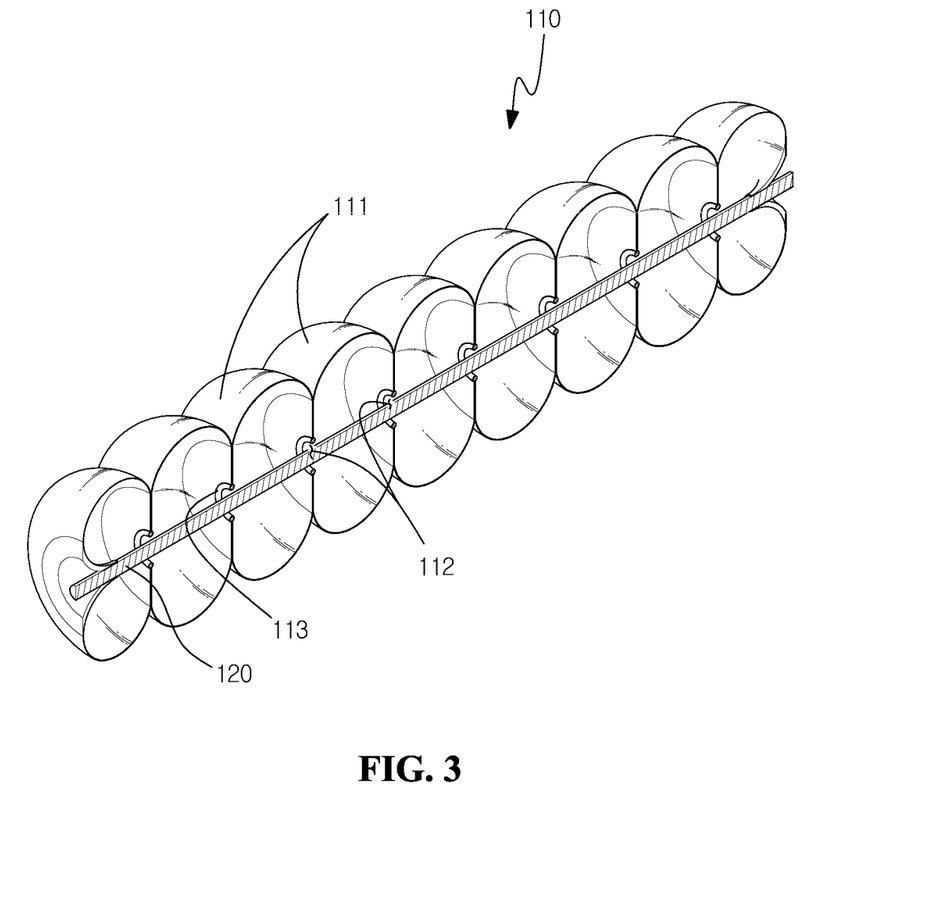
FIG. 3 illustrates an inner structure of the inner tank according to an embodiment of the present invention.

FIG. 1 is a cross-sectional view illustrating the structure of a compressed fuel tank 100 according to an embodiment of the present invention. FIG. 2 illustrates an inner tank 110 according to an embodiment of the present invention. FIG. 3 illustrates an inner structure of the inner tank 110 according to an embodiment of the present invention.

The compressed fuel tank 100 according to the present invention may store cryogenic liquefied gas such as liquefied hydrogen or liquefied natural gas. In the following embodiment, a fuel tank for storing hydrogen fuel typically applied to hydrogen vehicles will be described.

Referring to FIGS. 1 to 3, the compressed fuel tank 100 according to an embodiment of the present invention may comprise an inner tank 110, a support rod 120, an insulating member 130, an outer tank 140, and a rod support part 150.

The inner tank 110 may be formed to have a plurality of modular tanks 11 storing liquefied gas communicate with each other.

Here, each modular tank 111 may be formed of a metal material capable of storing cryogenic liquefied hydrogen, for example, may be formed of a metal material such as stainless steel, invar steel, nickel steel, high manganese steel, or aluminum. The higher the strength of the material, it is more likely that a modular tank 111 may be manufactured using a molding technology with thin plates.

Such modular tank 111 may be formed in a spherical or donut shape so that a storage space in which liquefied hydrogen is stored is formed therein, and a communication hole 112 may be formed in the center of the side portion connected to another modular tank 111.

At this time, the modular tank 111 of the present embodiment is formed in a spherical or donut shape so that the internal expansion pressure is uniformly applied to the inner surface of the rounded tank. Accordingly, it is possible to suppress stress from being concentrated in any one part of the tank and uniformly distribute the stress, thereby improving structural safety of the tank.

In addition, a modular tank 111 may be connected to another modular tank 111 by joining each other through welding. In this case, by bringing the communication hole 112 of a modular tank 111 in close contact with the communication hole 112 of another modular tank 111 so that the two face each other, and welding the periphery of the communication holes 112 closely contacting while facing each other, the center of the side portion of the modular tanks 111 facing each other may be connected by joining each other, and an inner tank 110 may be formed by connecting a plurality of modular tanks 111 in this manner.

At this time, a ring-shaped reinforcing material 113 corresponding to the communication hole 112 is provided so that the reinforcing material 113 is butt-welded along the communication hole 112 of the modular tanks 111 closely contacting while facing each other, and through the reinforcing material 113, the modular tanks 111 may join each other firmly, and deformation in communication hole 112 may be prevented.

The inner tank 110 formed in this manner allows liquefied hydrogen stored in a plurality of modular tanks 111 to flow between the modular tanks 111 through the communication holes 112.

As an example, the present embodiment shows an example in which the inner tank 110 is formed by connecting nine modular tanks 111 in one direction to communicate with each other. However, the inner tank 110 may be formed by increasing or reducing the number of modular tanks 111 to match the storage capacity of the liquefied hydrogen stored.

The support rod 120 may penetrate the central axis of the inner tank 110, and both sides of the inner tank 110 may be fixed at both ends thereof.

Specifically, the support rod 120 is formed in the shape of a bar and penetrates a plurality of modular tanks 111 configuring the inner tank 110. Accordingly, the modular tanks 111 disposed on both sides of the inner tank 110 may be fixed to both ends of the rod, respectively.

In other words, the support rod 120 is formed to have a smaller diameter than the communication hole 112 of the modular tank 111, and thus may be disposed to penetrate the communication hole 112 formed in each of the plurality of modular tanks 111. One end of the rod may join the outer side of the modular tank 111 disposed on one side of the inner tank 110, and the other end of the rod may join the outer side of the modular tank 111 disposed on the other side of the inner tank 110, to be fixed.

At this time, the modular tank 111 disposed on each of both sides of the inner tank 110 is formed so that the part joining the support rod 120 is rounded toward the inside of the tank, thereby suppressing stress from being concentrated in a joint area with the support rod 120.

As such, the support rod 120 is disposed to penetrate the inner tank 110 while only both ends of the rod are joined and fixed to both sides of the inner tank 110, thereby suppressing the inner tank 110 from expanding or contracting beyond a predetermined range in the longitudinal direction.

In other words, in the case of the inner tank 110 according to the present embodiment, the plurality of modular tanks 111 are connected to each other by partially welding only a periphery of the communication hole 112 so as to expand or contract according to temperature change, and thus it is possible to prevent damage caused by thermal deformation applied to the tank. Increase in the range of expansion or contraction may affect the insulating member 130 surrounding the inner tank 110 or the outer tank 140, and thus it is possible to suppress the plurality of modular tanks 111 from expanding or contracting beyond a predetermined range by fixing the modular tanks 111 disposed on both edges of the plurality of modular tanks 111 using the support rod 120.

In addition, both ends of the support rod 120 protrude from both sides of the inner tank 110 to be coupled to the rod support part 150 which will be described later.

In addition, in the present embodiment, the support rod 120 penetrating the communication hole 112 of the inner tank 110 maintains a predetermined distance from the reinforcing material 113 along the communication hole 112, so that there is a space of the communication hole between the support rod and the reinforcing material. However, when the tank is enlarged, a support part supporting the outer peripheral surface of the support rod may be provided in a portion of the space of the communication hole between the reinforcing material and the support rod to prevent sagging of the support.

The insulating member 130 is formed of multiple insulating materials and is provided to surround the inner tank 110 to block heat transfer to the outside.

Specifically, the insulating member 130 may comprise a first insulating material 131 molded by being sprayed onto the inner tank 110 using a spray method, a second insulating material 132 surrounding the first insulating material 131, and a third insulating material 133 formed of a hard insulating material to be coupled to the outer surface of the second insulating material 132.

Here, the first insulating material 131 may be formed to tightly surround the inner tank 110 by spraying polymer foam such as polyurethane foam using a spray method on the inner tank 110 to form foam.

At this time, the inner tank 110 to which a plurality of modular tanks 111 are joined has the curved outer surface, and thus may be molded to have an overall cylindrical appearance by spraying polymer foam on the curved outer surface.

In addition, the second insulating material 132 may be formed of one of a composite insulating material in which a plurality of aluminum thin films and spacers are layered, multiple layers of aerogel or multiple layers of glass wool, or a combination thereof. The second insulating material may be provided to surround the first insulating material 131 formed in a cylindrical shape.

Here, the composite insulating material is manufactured by having approximately 6 to 20 layers of aluminum thin film and a spacer with an air layer layered, and thus may provide excellent insulation performance in a vacuum environment between the inner tank 110 and the outer tank 140.

In addition, the third insulating material 133 is a hard polymer foam processed into a pipe shape. Polyurethane foam with insulating and cushioning properties may be used as a third insulating material 133, and the third insulating material 133 may be coupled to the outer surface of the second insulating material 132 formed in a cylindrical shape.

At this time, the third insulating material 133 formed in a pipe shape may serve as a cover surrounding the circumferential surface of the second insulating material 132 formed in a cylindrical shape.

Meanwhile, in the above-described embodiment, the insulating member 130 is configured to comprise a first insulating material 131, a second insulating material 132, and a third insulating material 133, but the insulating member 130 may also be configured to use only a second insulating material 132.

As an example, with respect to forming the space between the inner tank 110 and the outer tank 140 to be in a high vacuum state for improved insulation performance, considering that when using an insulating material formed of a foam such as a first insulating material 131 and a third insulating material 133, it may take much time to form a high vacuum state, it may be possible to form a high vacuum state easily by using only a second insulating material 132 as needed.

The outer tank 140 may be formed to accommodate the inner tank 110, the support rod 120, and the insulating member 130 described above thereinside.

The outer tank 140 may be formed of a metal material such as stainless steel or aluminum, and may surround and protect the inner tank 110, the support rod 120, and the insulating member 130.

In addition, the outer tank 140 may form the inside accommodating the inner tank 110, the support rod 120, and the insulating member 130 in a high vacuum state and seal the same, thereby improving insulation performance.

Meanwhile, the rod support part 150 may be fixed to both sides of the inside of the outer tank 140 to support both ends of the support rod 120.

Figure 4:
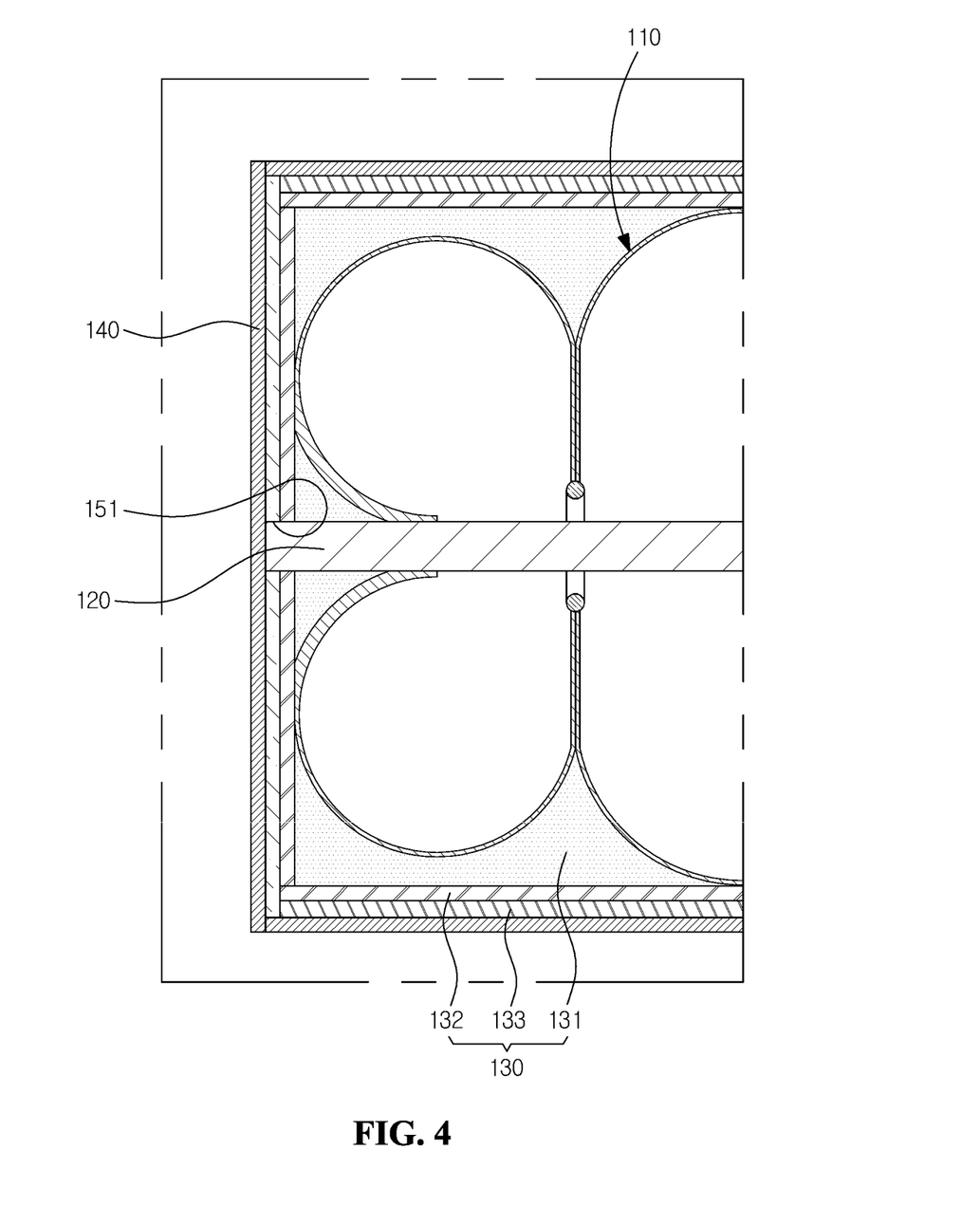
FIG. 4 illustrates a coupling structure of a rod support part and a support rod according to an embodiment of the present invention.

FIG. 4 illustrates a coupling structure of a rod support part 150 and a support rod 120 according to an embodiment of the present invention.

Referring to FIGS. 1 and 4, the rod support part 150 may be formed of plywood to be fixed to both sides of the inside of the outer tank 140.

Specifically, the rod support part 150 is formed in a disk shape corresponding to the side of the outer tank 140 to be integrally coupled to the inner side of the outer tank 140.

As an example, stud bolts may be formed on the inner side of the outer tank 140, and the rod support part 150 may be integrally coupled to the inner side of the outer tank 140 through the stud bolts.

In addition, a coupling hole 151 to which an end of the support rod 120 protruding from the inner tank 110 is coupled may be formed in the center of the rod support part 150.

As such, the rod support part 150 is integrally coupled to both sides of the inside of the outer tank 140, so that the inner tank 110 may be disposed between the pair of rod support parts 150, and both ends of the support rod 120 protruding from both sides of the inner tank 110 may be coupled to the coupling holes 151 of the rod support 150 facing each other.

Accordingly, the load of the inner tank 110 may be transferred to both sides of the outer tank 140 through the support rod 120 and the rod support part 150, so as to prevent deformation caused by applying the load of the inner tank 110 to the insulating member 130. Through this, it is possible to suppress the formation of a heat path in the insulating member 130, thereby securing insulation performance and increasing structural safety.

The compressed fuel tank 100 according to the present embodiment compresses and stores hydrogen at a high pressure, so as to be easily manufactured using relatively inexpensive materials compared to existing hydrogen fuel tanks using expensive composite materials to withstand high pressure, and easily store cryogenic liquefied hydrogen, thereby increasing hydrogen storage capacity and reducing fuel tank manufacturing costs.

In particular, the compressed fuel tank 100 of the present embodiment is configured to store cryogenic liquefied hydrogen, thereby maintaining a relatively low pressure compared to existing hydrogen fuel tanks which compress and store hydrogen at a high pressure, and store hydrogen at a high density, thereby increasing hydrogen storage.

In addition, since hydrogen is stored at a high density, it is possible to greatly reduce the volume and weight compared to existing hydrogen fuel tanks with the same capacity, thereby being easily installed in vehicles.

As an example, when the compressed fuel tank 100 of the present embodiment is formed as a cylindrical tank with a diameter of 650 mm to 660 mm and a length of 2500 mm to 2700 mm, it may store approximately 40 kg to 50 kg of liquefied hydrogen.

In addition, the inner tank 110 may be easily protected through the outer tank 140 and multiple insulating materials, and even if an accident occurs where the inner tank 110 bursts due to external shock or internal pressure, the multiple insulating materials provide a buffering effect, thereby minimizing the shock wave emitted from the inner tank 110 and promoting safety in vehicles.

Moreover, since multiple insulating materials absorb shock from external shocks, the shock transferred to the inner tank 110 is alleviated, thereby providing additional safety from external shock such as traffic accidents, compared to existing tanks.

Meanwhile, a compressed fuel tank 100 applied to vehicles has been described in the above-described embodiment, but it is obvious that the present invention is not necessarily limited thereto and can be applied to various means of transportation such as ships using liquefied gas.

As described above, the compressed fuel tank 100 according to an embodiment of the present invention is provided with multiple insulating members 130 to surround an inner tank 110 which stores liquefied hydrogen, to be accommodated in the outer tank 140 functioning as a vacuum jacket. Accordingly, the compressed fuel tank may provide improved insulation performance, as well as safe and easy storage of cryogenic liquid hydrogen, and may also store hydrogen at a high density, thereby increasing hydrogen storage capacity.

In particular, the support rod 120 is provided to protrude on both sides of the inner tank 110 which stores liquefied hydrogen, and a rod support part 150 supporting the support rod 120 is integrally provided on both sides of the inside of the outer tank 140 accommodating the inner tank 120, to transfer the load of the inner tank 110 to both sides of the outer tank 140 through the support rod 120 and the rod support part 150. Accordingly, it is possible to prevent the load of the inner tank 110 from being applied to the insulating member 130 and causing deformation, thereby securing insulation performance and increasing structural stability.

In addition, the inner tank 110 is formed to have a plurality of modular tanks 111 communicate with each other. Accordingly, it is possible to manufacture the inner tank 110 by increasing or reducing the number of modular tanks 111 to match the storage capacity of liquefied hydrogen.

In addition, the modular tank 111 is formed in a spherical or donut shape so that the internal expansion pressure is uniformly applied to the inner surface of the rounded tank. Accordingly, it is possible to suppress stress from being concentrated in any one part of the tank and uniformly distribute the stress, thereby improving structural safety of the tank.

In addition, since the plurality of modular tanks 111 are connected in one direction by partially welding only the central portion, the plurality of modular tanks 111 may expand or contract according to temperature change, thereby preventing damage caused by thermal deformation applied to the tank. In addition, by fixing both sides of the inner tank 110 to the support rod 120, it is possible to suppress the plurality of modular tanks 111 from expanding or contracting beyond a predetermined range, thereby improving structural stability by preventing the insulating member 130 surrounding the inner tank 110 or the outer tank 140 from being affected.

The embodiments of the present invention described in the present specification and drawings are merely illustrative examples of the present invention to easily explain the technical disclosure of the present invention and facilitate understanding of the present invention, and are not intended to limit the scope of the present invention.

Accordingly, in addition to the embodiments described above, all modifications or changes derived based on the technical idea of the present invention should be construed as being included in the scope of the present invention.

The invention claimed is:
1. A compressed fuel tank, comprising:
an inner tank for storing liquefied gas;
a support rod penetrating a central axis of the inner tank, wherein both sides of the inner tank are fixed to both ends of the support rod;
an outer tank accommodating the inner tank and the support rod; and a first rod support part and a second rod support part, both of which being respectively fixed to both sides of inside of the outer tank and respectively supporting both ends of the support rod to transfer a load of the inner tank to both sides of the outer tank, wherein the inner tank comprises a plurality of modular tanks, wherein the plurality of modular tanks includes a communication hole formed in an interconnected area thereof, and wherein a support part supporting an outer peripheral surface of the support rod is provided in the communication hole to prevent the support rod from sagging.

2. The compressed fuel tank of claim 1, wherein the first rod support part and the second rod support part are plates and respectively integrally fixed to the both sides of the inside of the outer tank, the inner tank is disposed between the first rod support part and the second rod support part, and coupling holes are formed on the plates, and both ends of the support rod are respectively coupled to the coupling holes.

3. The compressed fuel tank of claim 1, wherein the plurality of modular tanks stores the liquefied gas and communicate with each other.

4. The compressed fuel tank of claim 3, wherein each modular tank is in a spherical or donut shape to uniformly distribute internal stress.

5. The compressed fuel tank of claim 3, wherein the plurality of modular tanks are connected by joining each other to expand or contract according to temperature change, and wherein modular tanks disposed on both edges of the plurality of modular tanks are fixed to the support rod to suppress the plurality of modular tanks from expanding or contracting beyond a predetermined range.

6. The compressed fuel tank of claim 5, wherein the plurality of modular tanks include a ring-shaped reinforcing material along the communication hole.

7. The compressed fuel tank of claim 6, wherein the support rod penetrates the communication hole formed in the plurality of modular tanks, and the outer peripheral surface of the support rod is disposed at a predetermined distance from the reinforcing material along the communication hole so that a space in which the liquefied gas flows is formed between the outer peripheral surface of the support rod and the communication hole.

8. The compressed fuel tank of claim 1, wherein the inner tank is made of at least one of stainless steel, invar steel, nickel steel, high manganese steel, or aluminum.

9. The compressed fuel tank of claim 1, further comprising an insulating member surrounding the inner tank to block heat transfer to outside and including:

a first insulating material disposed on a curved outer surface of the inner tank and having a cylindrical shape;

a second insulating material surrounding the first insulating material; and a third insulating material formed in a pipe shape and coupled to an outer surface of the second insulating material.

10. The compressed fuel tank of claim 9, wherein the first insulating material is formed of a spray-type polyurethane foam, the second insulating material is formed of at least one of a composite insulating material in which a plurality of aluminum thin films and spacers are layered, aerogel, or glass wool, and the third insulating material is formed of polyurethane foam processed into the pipe shape.

11. The compressed fuel tank of claim 9, wherein the insulating member is made of a composite insulating material in which a plurality of aluminum thin films and spacers are layered to surround the inner tank.

* * * * *